(12) United States Patent
Yim

(10) Patent No.: US 12,015,729 B2
(45) Date of Patent: Jun. 18, 2024

(54) MOBILE PHONE HOLDER

(71) Applicant: Stripebird Inc., Toronto (CA)

(72) Inventor: Grant Yim, Toronto (CA)

(73) Assignee: Stripebird Inc., Toronto (CA)

( * ) Notice: Subject to any disclaimer, the term of this patent is extended or adjusted under 35 U.S.C. 154(b) by 191 days.

(21) Appl. No.: 17/900,546

(22) Filed: Aug. 31, 2022

(65) Prior Publication Data

US 2024/0073310 A1    Feb. 29, 2024

(51) Int. Cl.
*H04M 1/04*    (2006.01)
*H04M 1/06*    (2006.01)

(52) U.S. Cl.
CPC ..................... *H04M 1/06* (2013.01)

(58) Field of Classification Search
CPC .................. H04M 1/04; H04M 1/06
See application file for complete search history.

(56) References Cited

U.S. PATENT DOCUMENTS 8,857,687 B1 * 10/2014 An ..................... B60R 11/02
                                                224/482
9,799,436 B2 * 10/2017 Lee ....................... H01F 7/021

* cited by examiner

*Primary Examiner* — Tuan D Nguyen
(74) *Attorney, Agent, or Firm* — Rowand LLP

(57) ABSTRACT

A mobile device holder is disclosed. The mobile device holder includes: a base plate having a support surface and a rear surface opposite to the support surface; a first holder element arranged on the support surface at a first end of the base plate; a second holder element arranged in spaced relation to the first holder element, the second holder element being movable to a securing position to fixedly secure a mobile device between the first and second holder elements; and a magnet chamber extending from the rear surface of the base plate, the magnet chamber containing at least one magnet.

15 Claims, 5 Drawing Sheets

MOBILE PHONE HOLDER

TECHNICAL FIELD

The present disclosure relates to mobile accessories and, in particular, to an apparatus for holding a mobile device.

BACKGROUND

When participating in certain physical activities (e.g., sports such as golf), it is generally not practical for users to carry their mobile devices, such as mobile phones, on their person—either carrying with their hands or in a pocket—for prolonged periods of time. A mobile phone may add unnecessary bulk to the user's clothing and hinder their movements. At the same time, it may be desirable to have easy and convenient access to the mobile phone. For example, users may wish to view relevant information, such as statistics or mapping data, relating to their current activity on their mobile phone, or use their mobile phone to record videos of their activity.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
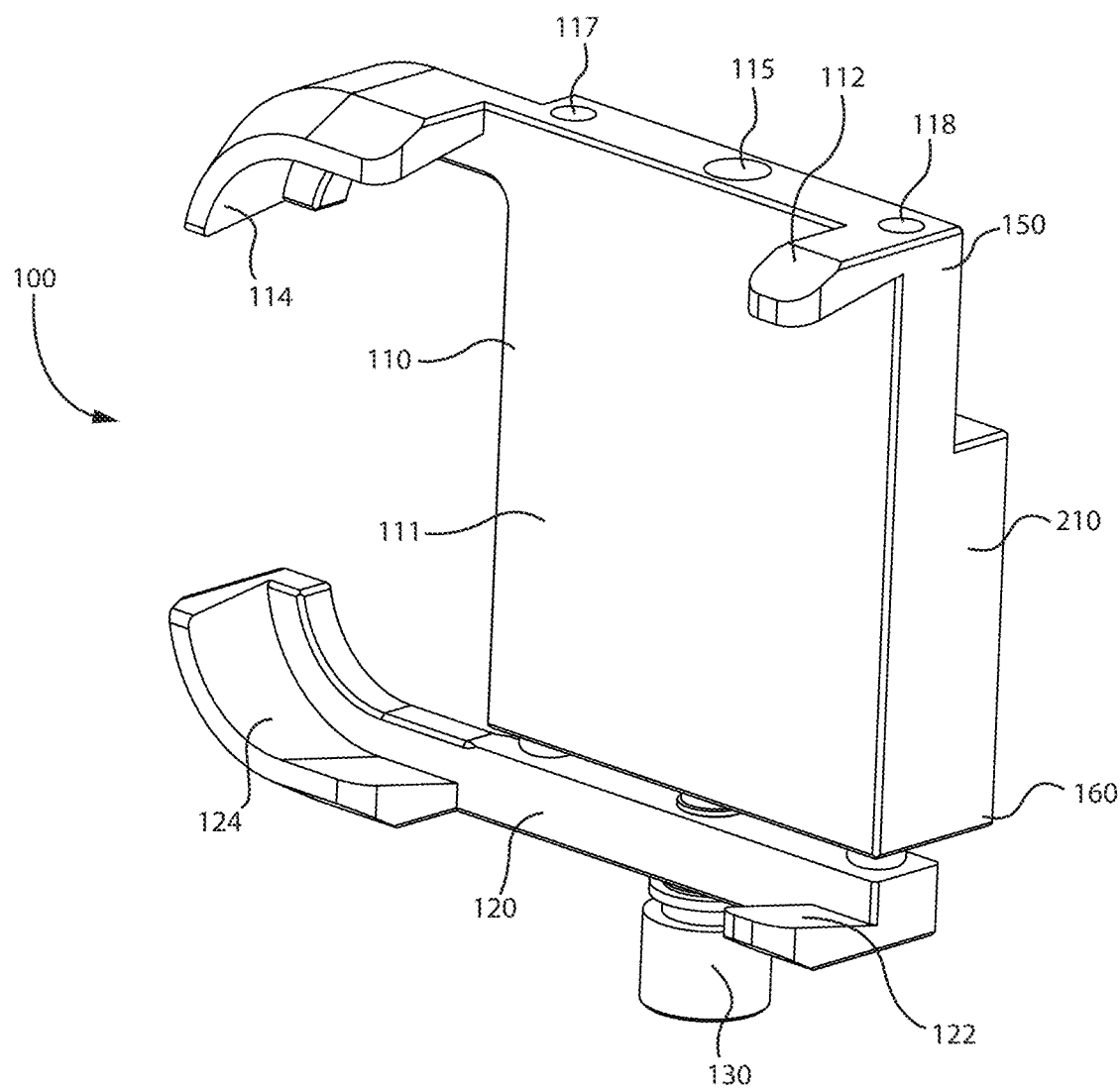
FIG. 1 is a perspective view of an example mobile device holder.

In an aspect, the present disclosure describes a mobile device holder. The mobile device holder includes: a base plate having a support surface and a rear surface opposite to the support surface; a first holder element arranged on the support surface at a first end of the base plate; a second holder element arranged in spaced relation to the first holder element, the second holder element being movable to a securing position to fixedly secure a mobile device between the first and second holder elements; and a magnet chamber extending from the rear surface of the base plate, the magnet chamber containing at least one magnet.

In some implementations, the at least one magnet may comprise one or more neodymium magnets.

In some implementations, the mobile device holder may further include a side plate that is movably coupled to the base plate at a second end of the base plate opposite to the first end, and the second holder element may be arranged on the side plate.

In some implementations, the first holder element may comprise a first side wall extending substantially perpendicularly from the support surface of the base plate and the second holder element may comprise a second side wall extending substantially parallel to the first side wall.

In some implementations, the mobile device holder may further include a threaded rod element that is rotatable to drive the side plate to move toward and away from the first end of the base plate.

In some implementations, the base plate may define a first threaded hole extending from the second end of the base plate toward the first end of the base plate and the threaded rod element may include a threaded portion that is engageable with the first threaded hole.

In some implementations, the mobile device holder may further include a rotating knob for controllably rotating the threaded rod element.

In some implementations, the magnet chamber may be positioned at a second end of the base plate opposite to the first end.

In some implementations, the magnet chamber may comprise a housing that defines one or more interior compartments for holding the at least one magnet and a protective cover that covers the one or more interior compartments.

In some implementations, the housing may be made of silicone.

In some implementations, the magnet chamber may be integrally constructed with the base plate.

In some implementations, the mobile device holder may further include a first seat member arranged on the support surface of the base plate and a second seat member arranged on the side plate opposite to the first seat member, the first and second seat members adapted for supporting adjacent corners of a mobile device.

In some implementations, the first seat member may comprise a first rounded side wall extending from the support surface of the base plate and the second seat member may comprise a second rounded side wall extending from the side plate.

In some implementations, the mobile device holder may further include at least one guide rod and the base plate may define guide holes extending from the second end of the base plate toward the first end of the base plate, the guide holes being sized to slidingly receive the at least one guide rod.

In some implementations, a width of the magnet chamber may be less than a width of the base plate.

Other example embodiments of the present disclosure will be apparent to those of ordinary skill in the art from a review of the following detailed descriptions in conjunction with the drawings.

Figure 4:
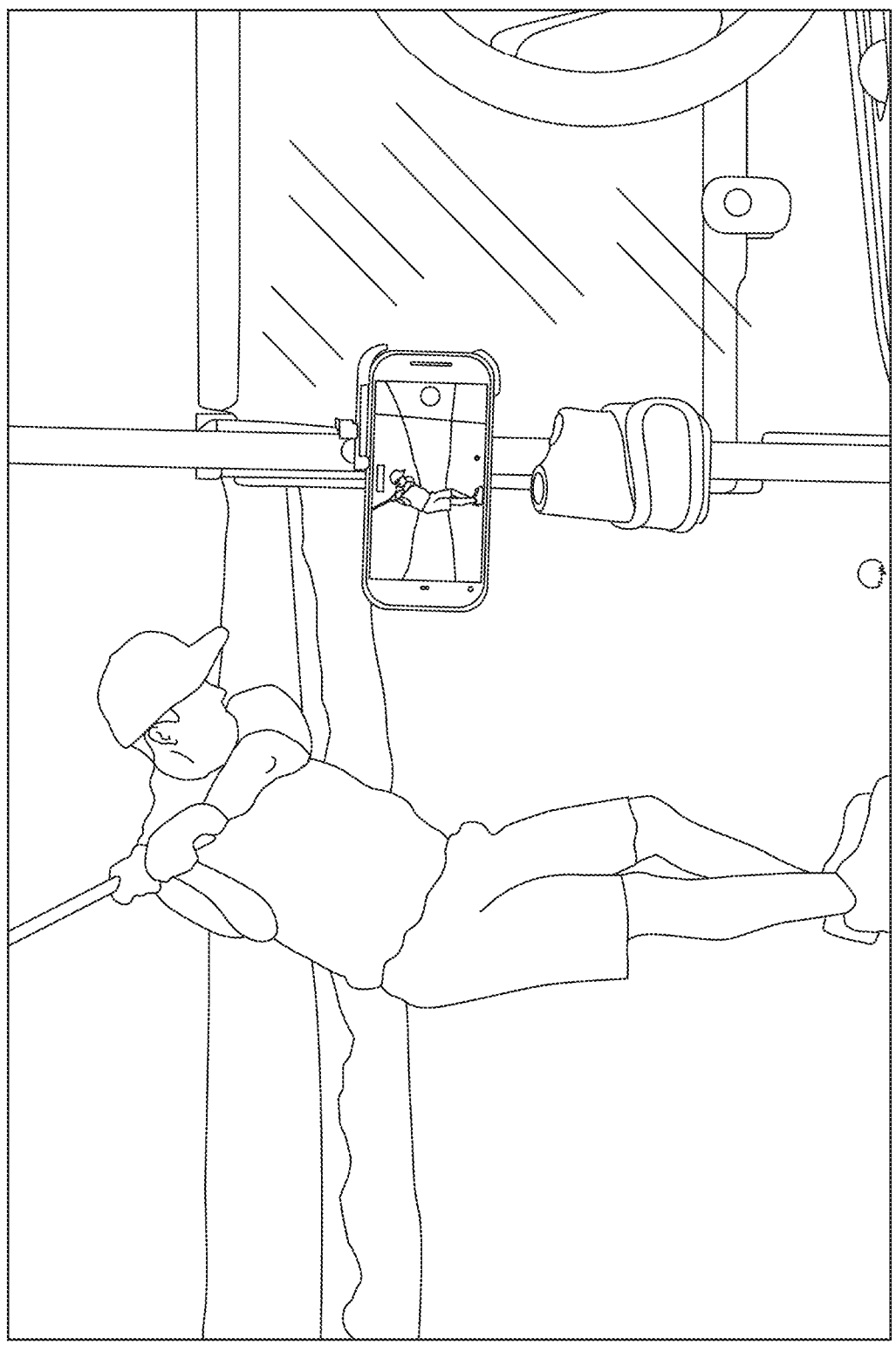
FIG. 4 shows the example mobile device holder of FIG. 1 affixed to a golf cart.
Figure 5:
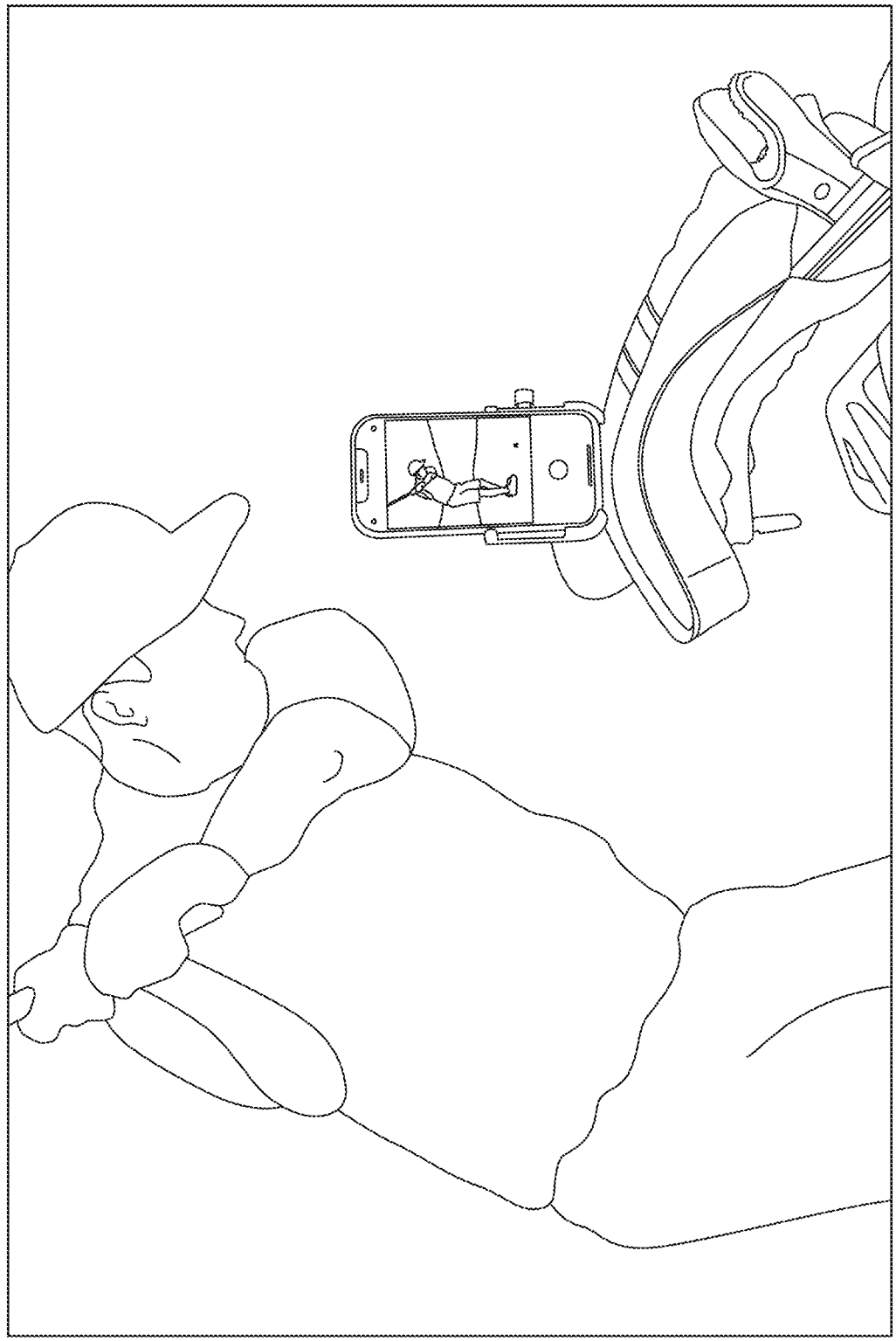
FIG. 5 shows the example mobile device holder of FIG. 1 affixed to a golf club head.

An apparatus for securely holding a mobile device is disclosed. The apparatus is configured for attaching and securing to metal surfaces. For example, during golf play, the apparatus may be affixed to a suitable metal surface, such as a golf cart roof support bar (as shown in FIG. 4) or the head of a golf club (as shown in FIG. 5). More generally, the apparatus allows a mobile device to be fixedly secured to an exposed metal surface, facilitating easy and convenient access to the mobile device for the user. In particular, the apparatus may be affixed to a metal surface so as to secure a mobile device that is held in the apparatus at a desired position and orientation with respect to the metal surface.

Figure 2:
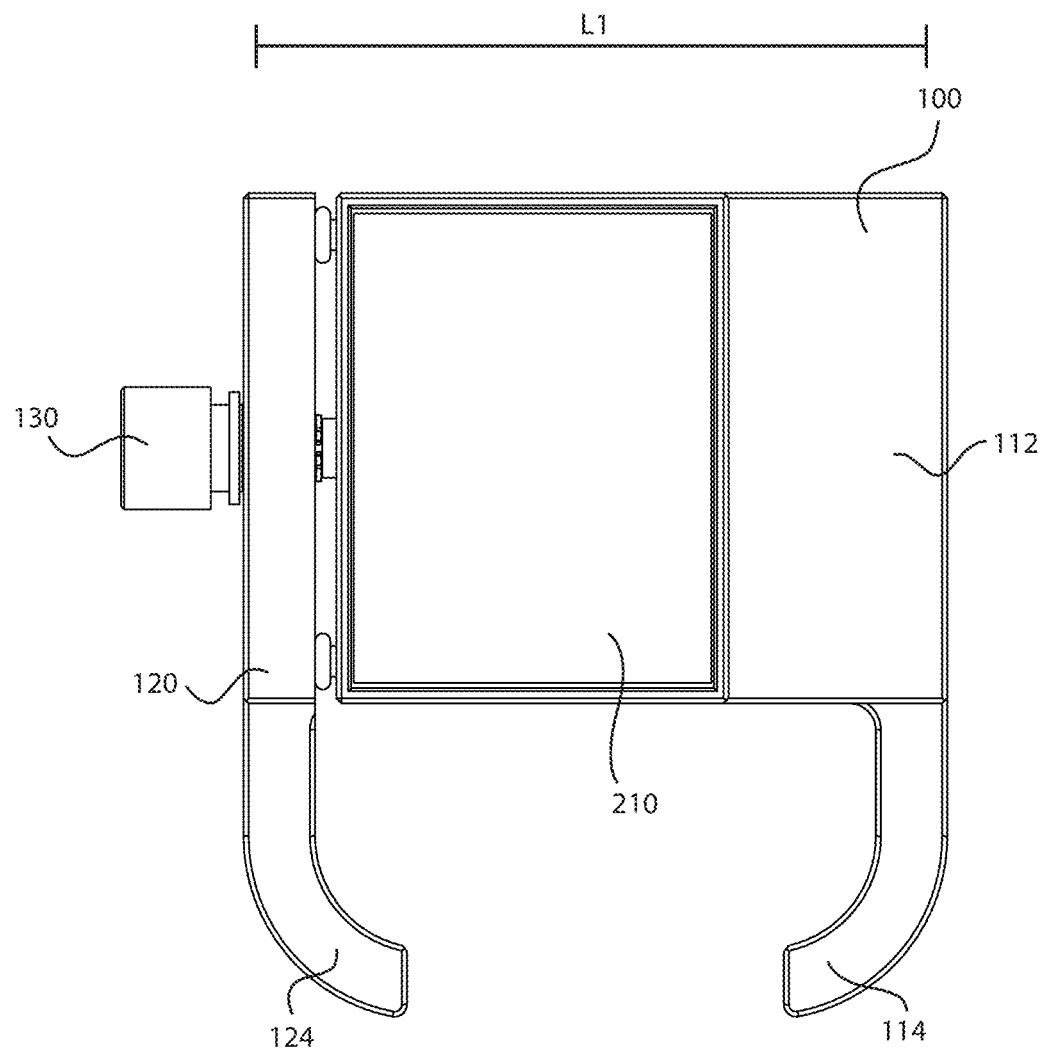
FIG. 2 is a rear view of the example mobile device holder of FIG. 1.

Reference is now made to FIG. 1, which shows a perspective view of an example mobile device holder 100, and FIG. 2, which shows a rear view of the example mobile device holder 100. The mobile device holder 100 is configured to securely hold a mobile phone, or other similar mobile device (e.g., a tablet computer, etc.).

The mobile device holder 100 includes a base plate 110. The base plate 110 has two opposed surfaces. Specifically, the base plate 110 has a support surface 111 on a first side of the base plate 110 and a rear surface 112 on a second side of the base plate 110 opposite to the first side. The support surface 111 is a surface of the base plate 110 which supports a mobile device when the mobile device is held in the mobile device holder 100. For example, a mobile phone may be brought into contact with the support surface 111 when the mobile phone is secured to the mobile device holder 100. The rear surface 112 is opposite to the support surface 111. When the mobile device holder 100 is attached to a metal surface (e.g., a golf club head, a metal pole, etc.), the rear surface 112 is adjacent to and faces the metal surface. The base plate 110 has a first end 150 and a second end 160 opposite to the first end 150. The distance between the first end 150 and the second end 160 may be at least 2.5 inches. The thickness of the base plate 110, or the distance between the support surface 111 and the rear surface 112, may be at least 1 inch.

The mobile device holder 100 includes a first holder element 112. The first holder element 112 is arranged on the support surface 111 of the base plate 110. In particular, the first holder element 112 is located at the first end 150 of the base plate 110. In at least some embodiments, the first holder element 112 is a side wall that extends substantially perpendicularly from the support surface 111. As shown in FIG. 1, the first holder element 112 may be a side wall that extends a predetermined distance from the support surface 111. For example, a height of the side wall may be greater than 10 millimeters. The first holder element 112 has an inner wall surface and an outer wall surface opposite to the inner wall surface. The inner wall surface of the first holder element 112 contacts a mobile device when the mobile device is secured to the mobile device holder 100.

The mobile device holder 100 also includes a second holder element 122. The second holder element 122 is arranged in spaced relation to the first holder element 112. In at least some embodiments, the second holder element 122 is a side wall that extends substantially parallel to the first holder element 112. The second holder element 122 has an inner wall surface and an outer wall surface opposite to the inner wall surface. The inner wall surface of the second holder element 122 contacts a mobile device when the mobile device is secured to the mobile device holder 100. In particular, the first holder element 112 and the second holder element 122 may be corresponding side walls that are shaped for pressing against side surfaces of a mobile device to releasably retain the mobile device in the mobile device holder 100. For example, a mobile device may be retained between the first and second holder elements and against the support surface 111. The pressing of the first and second holder elements against respective side surfaces of a mobile device secures the mobile device to the mobile device holder 100. Specifically, the mobile device is secured between an inner wall surface of the first holder element 112 and an inner wall surface of the second holder element 122.

Figure 3:
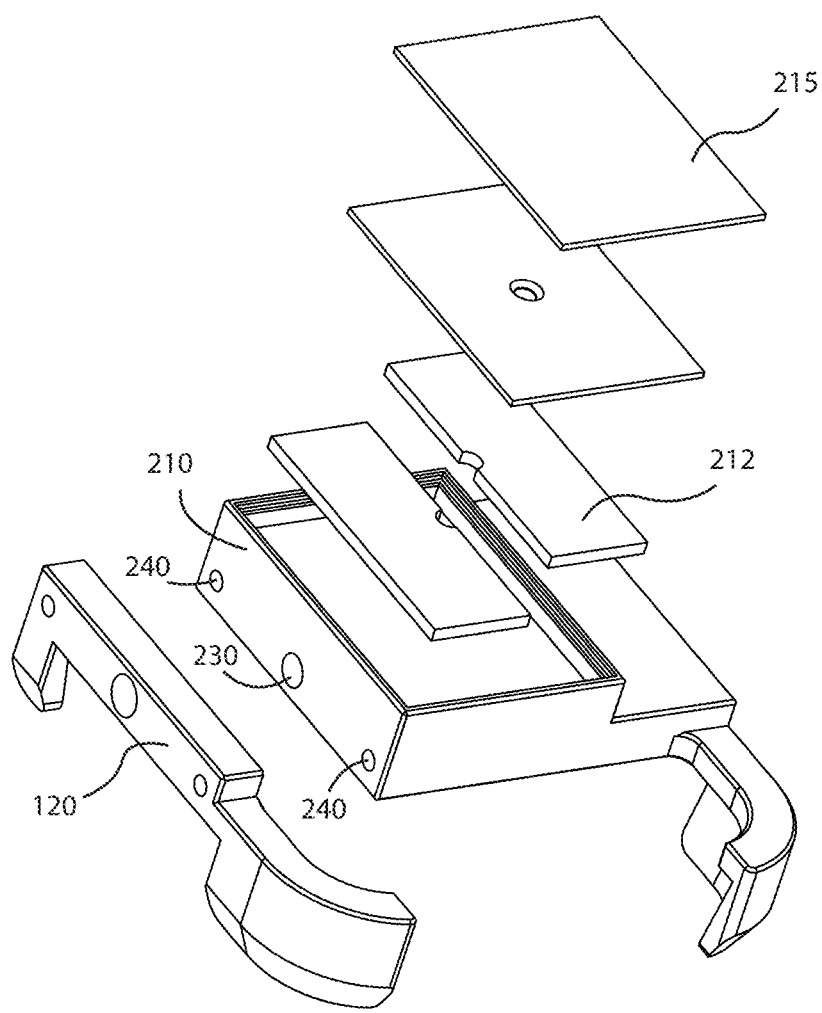
FIG. 3 is a partial exploded view of the example mobile device holder of FIG. 1.

In at least some embodiments, the mobile device holder 100 includes a side plate 120. As shown in FIG. 3, the base plate 110 and the side plate 120 are separate components of the mobile device holder 100. The side plate 120 is movably coupled to the base plate 110. In particular, the side plate 120 is coupled to the second end 160 of the base plate 110 opposite to the first end 150. The side plate 120 is controllably movable toward and away from the base plate 110. In particular, the side plate 120 can be moved to vary a distance between the side plate 120 and the second end 160 of the base plate 110.

The movement of the side plate 120 relative to the base plate 110 is controlled by a manual mechanism. In at least some embodiments, the mobile device holder 100 may include a rod element that is used to drive the side plate 120 to move toward and away from the base plate 110. Specifically, a threaded rod element may be provided such that rotation of the rod element drives the side plate 120 to move laterally relative to the base plate 110. As shown in FIG. 3, the base plate 110 may define a first threaded hole 230 extending from the second end 160 of the base plate 110 toward the first end 150 of the base plate 110. The threaded rod element includes a threaded portion that is engageable with the first threaded hole 230.

The mobile device holder 100 may include a rotating knob 130 for controllably rotating the threaded rod element. The rotating knob 130 is operatively coupled to the threaded rod element so as to allow rotation of the threaded rod element. The rotating knob 130 may be rotated in a first direction to cause the side plate 120 to move away from the base plate 110, and rotated in an opposite second direction to cause the side plate 120 to move toward the base plate 110.

Additional components may facilitate guiding the movement of the side plate 120 relative to the base plate 110. For example, in some embodiments, the mobile device holder 100 may include at least one guide rod. As shown in FIG. 3, the base plate 110 may define guide holes 240 extending from the second end 160 of the base plate 110 toward the first end 150 of the base plate 110, where the guide holes 240 are sized to slidingly receive the at least one guide rod.

In the example embodiment illustrated in FIG. 1, the second holder element 122 is arranged on the side plate 120. By moving the side plate 120 relative to the base plate 110, a distance between the first holder element 112 and the second holder element 122 can be varied. The distance between the first holder element 112 and the second holder element 122 represents a width of a receiving space for receiving a mobile device in the mobile device holder 100. In FIG. 2, the width of the receiving space is indicated as L1. This width may be less than a distance between the outer surface of the first holder element 112 and the outer surface of the second holder element 122. The width of the receiving space can be suitably increased or decreased to accommodate the width of a particular mobile device that is desired to be held in the mobile device holder 100. In some embodiments, the width of the receiving space can be varied between 2.5 inches and 4.5 inches.

The mobile device holder 100 may include additional components for supporting and fixedly securing a mobile device to the mobile device holder 100. In at least some embodiments, the mobile device holder 100 includes a first seat member 114 and a second seat member 124. The first seat member 114 is arranged on the base plate 110. Specifically, the first seat member 114 may be arranged on the support surface 111 of the base plate 110. The first seat member may be a first rounded side wall that extends substantially perpendicularly from the support surface 111. As shown in FIG. 1, the second seat member 124 may be arranged on the side plate 120. The second seat member 124 is arranged such that it is opposite to the first seat member 114. The second seat member 124 may be a second rounded side wall that extends from the side plate 120. In particular, the second seat member 124 and the second holder element 122 extend substantially perpendicularly from a same surface on a first side of the side plate 120. The first and second seat members are adapted for supporting adjacent corners of a mobile device. In particular, when a mobile device is secured to the mobile device holder 100, each bottom corner of the mobile device may rest on and be supported by a respective one of the first and second seat members.

FIGS. 4 and 5 show a mobile phone that is secured to a mobile device holder in accordance with example embodiments of the present disclosure. The bottom corners of the mobile phone are in contact with and supported by first and second seat members of the mobile device holder. The top corners of the mobile phone remain exposed, and are not in contact with any portion of the mobile device holder. More generally, at least part of an upper portion of the mobile phone is not in contact with any portion of the mobile device holder. The lens of a camera module on the back of the mobile phone are thus unimpeded by the mobile device holder. In this way, the camera(s) of the mobile phone may be used to capture images and videos while the mobile phone is securely held in the mobile device holder.

The mobile device holder 100 also includes a magnet chamber 210. The magnet chamber 210 contains therein at least one magnet 212. For example, the magnet chamber 210 may contain two magnets. As shown in FIG. 3, the magnets may be arranged adjacent to each other. In particular, the magnets may be arranged substantially collinearly. The at least one magnet 212 may be made from alloys of rare-earth elements. In some embodiments, the at least one magnet 212 may be made from an alloy containing, at least, neodymium. For example, the at least one magnet 212 may be made from an alloy that includes neodymium and iron.

The magnet chamber 210 extends from the rear surface 112 of the base plate 110. In at least some embodiments, the magnet chamber 210 comprises a housing that contains the at least one magnet 212. Specifically, the magnet chamber 210 may be a housing having walls that define an interior space for holding the at least one magnet 212. For example, the walls of the magnet chamber 210 may define one or more interior compartments, with each interior compartment holding a respective one of the at least one magnet 212.

The magnet chamber 210 may comprise side walls having a fixed height. For example, the side walls may each have a height of at least 0.5 inch. That is, the side walls of the magnet chamber 210 may extend at least 0.5 inch from the rear surface 112 of the base plate 110. The housing of the magnet chamber 210 may be made of silicone or any other suitable material.

The housing of the magnet chamber 210 may include a protective cover 215 for covering the one or more interior compartments and any magnets contained therein. The protective cover 215 may, for example, form an outer wall of the magnet chamber 210. The magnetic force of the at least one magnet 212 disposed in the magnet chamber 210 allows the mobile device holder 100 to be affixed to a metal surface. When the mobile device holder 100 is affixed to a metal surface, the protective cover 215 makes contact with the metal surface. The protective cover 215 serves to protect the magnet(s) in the magnet chamber 210 from damage or external contact. The protective cover 215 may be integrally formed with the housing, or it may be a separate component that is fixedly coupled to the housing. For example, the protective cover 215 may be a removable cover for the housing of the magnet chamber 210.

In some embodiments, the magnet chamber 210 may be integrally constructed with the base plate 110. That is, the magnet chamber 210 and the base plate 110 may be formed as a single unitary structure. For example, the side walls of the magnet chamber 210 may be integral with and extend from the rear surface 112 of the base plate 110. Alternatively, the magnet chamber 210 may be a separate housing that is removably coupled to the rear surface 112 of the base plate 110.

In at least some embodiments, a width of the magnet chamber 210 is less than a width of the base plate 110. The magnet chamber 210 may have a width between 1 and 2 inches. For example, the width of the magnet chamber 210 may be 1.5 inch. The magnet chamber 210 may be positioned on the rear surface 112 at any point on or between the first end 150 and the second end 160 of the base plate 110. For example, the magnet chamber 210 may be positioned at the second end of the base plate 110. As another example, the magnet chamber 210 may be centrally positioned along the rear surface 112.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A mobile device holder comprising:
a base plate having a support surface and a rear surface opposite to the support surface;
a first holder element arranged on the support surface at a first end of the base plate;
a second holder element arranged in spaced relation to the first holder element, the second holder element being movable to a securing position to fixedly secure a mobile device between the first and second holder elements; and
a magnet chamber extending from the rear surface of the base plate, the magnet chamber containing at least one magnet.

2. The mobile device holder of claim 1, wherein the at least one magnet comprises one or more neodymium magnets.

3. The mobile device holder of claim 1, further comprising a side plate that is movably coupled to the base plate at a second end of the base plate opposite to the first end, wherein the second holder element is arranged on the side plate.

4. The mobile device holder of claim 3, wherein the first holder element comprises a first side wall extending substantially perpendicularly from the support surface of the base plate and wherein the second holder element comprises a second side wall extending substantially parallel to the first side wall.

5. The mobile device holder of claim 3, further comprising a threaded rod element that is rotatable to drive the side plate to move toward and away from the first end of the base plate.

6. The mobile device holder of claim 5, wherein the base plate defines a first threaded hole extending from the second end of the base plate toward the first end of the base plate and wherein the threaded rod element includes a threaded portion that is engageable with the first threaded hole.

7. The mobile device holder of claim 5, further comprising a rotating knob for controllably rotating the threaded rod element.

8. The mobile device holder of claim 3, further comprising a first seat member arranged on the support surface of the base plate and a second seat member arranged on the side plate opposite to the first seat member, the first and second seat members adapted for supporting adjacent corners of a mobile device.

9. The mobile device holder of claim 1, wherein the magnet chamber is positioned at a second end of the base plate opposite to the first end.

10. The mobile device holder of claim 9, wherein the housing is made of silicone.

11. The mobile device holder of claim 1, wherein the magnet chamber comprises a housing that defines one or more interior compartments for holding the at least one magnet and a protective cover that covers the one or more interior compartments.

12. The mobile device holder of claim 1, wherein the magnet chamber is integrally constructed with the base plate.

13. The mobile device holder of claim 12, wherein the first seat member comprises a first rounded side wall extending from the support surface of the base plate and the second seat member comprises a second rounded side wall extending from the side plate.

14. The mobile device holder of claim 1, further comprising at least one guide rod and wherein the base plate defines guide holes extending from the second end of the base plate toward the first end of the base plate, the guide holes being sized to slidingly receive the at least one guide rod.

15. The mobile device holder of claim 1, wherein a width of the magnet chamber is less than a width of the base plate.

* * * * *